United States Patent [19]

Senyek et al.

[11] 4,365,027

[45] Dec. 21, 1982

[54] REMOVAL OF ACRYLONITRILE FROM LATEX WITH OXIMES

[75] Inventors: Michael L. Senyek, Tallmadge; Albert J. Costanza, Fairlawn, both of Ohio

[73] Assignee: The Goodyear Tire & Rubber Company, Akron, Ohio

[21] Appl. No.: 334,770

[22] Filed: Dec. 28, 1981

[51] Int. Cl.$^3$ .............................................. C08K 5/16
[52] U.S. Cl. ..................................... 523/332; 528/492
[58] Field of Search ......................... 523/332; 528/492

[56] References Cited

U.S. PATENT DOCUMENTS

| | | | |
|---|---|---|---|
| 3,692,726 | 9/1972 | Oehmichen | 524/247 |
| 4,196,111 | 4/1980 | Gomez | 528/492 |
| 4,251,412 | 2/1981 | Ferrini | 528/492 |
| 4,255,307 | 3/1981 | Miller | 528/487 |
| 4,272,425 | 6/1981 | Miller et al. | 528/492 |
| 4,278,582 | 7/1981 | Miller | 528/490 |

Primary Examiner—Joseph L. Schofer
Assistant Examiner—N. Sarofim
Attorney, Agent, or Firm—A. T. Rockhill

[57] ABSTRACT

Acrylonitrile is a monomer that is widely used in the synthesis of a vast variety of polymers. Undesirable quantities of unpolymerized residual acrylonitrile are often present in these acrylonitrile polymers. This residual or free acrylonitrile dissolved in an acrylonitrile polymer and/or its emulsifier system and the water phase used in its polymerization can be reduced significantly in concentration by treatment with oximes. Oximes react with acrylonitrile by an oxygen-cyanoethylation reaction which results in the formation of a cyanoethyl oximino ether linkage.

14 Claims, No Drawings

REMOVAL OF ACRYLONITRILE FROM LATEX WITH OXIMES

BACKGROUND OF THE INVENTION

Acrylonitrile monomer is a basic building block for a number of very important polymers. By polymerizing acrylonitrile polyacrylonitrile may be obtained. It is a white fiber that has a very good resistance to acids, common solvents, oils, greases, salts, and sunlight. Nitrile rubbers which have excellent abrasion, oil and chemical resistance are prepared by the copolymerization of butadiene and acrylonitrile. Acrylonitrile monomer can be utilized in a great many other copolymers and terpolymers.

After the synthesis of a polymer that contains linkages that are derived from acrylonitrile is completed, some unpolymerized acrylonitrile monomer will still be present. Polymers that contain acrylonitrile linkages, acrylonitrile polymers, are normally synthesized by emulsion polymerization in an aqueous system. The unpolymerized residual acrylonitrile normally remains in both the acrylonitrile polymer itself and in the water. The normal procedure of stripping by vacuum or steam does not usually remove all of this undesirable residual acrylonitrile. Since acrylonitrile is believed to be toxic, it would be highly desirable to remove substantially all free residual acrylonitrile.

SUMMARY OF THE INVENTION

Residual acrylonitrile dissolved in polymers and/or the emulsifier system and the water phase used in the polymerization of a polymer can be reduced significantly by treatment with at least a stoichiometric amount of an oxime based on the amount of residual acrylonitrile present. Oximes react with residual acrylonitrile by an oxygen-cyanoethylation reaction with the reaction product remaining in the polymer system. For example, when reacted with acetone oxime, addition across the double bond of acrylonitrile occurs according to the reaction:

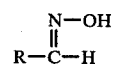
$$CH_3-\overset{\overset{N-OH}{\|}}{C}-CH_3 + CH_2=CH-C\equiv N \longrightarrow$$

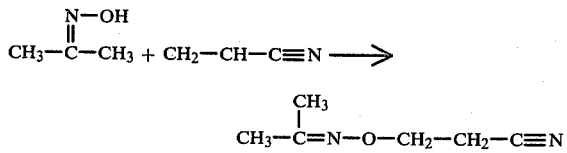
$$CH_3-\overset{\overset{CH_3}{|}}{C}=N-O-CH_2-CH_2-C\equiv N$$

Any oxime or mixture of oximes can be used to react with free or residual acrylonitrile since oximes will add to an activated double bond of an olefin. This addition across the double bond of acrylonitrile results in the formation of a cyanoethyl oximine ether linkage.

This invention discloses an improved process for reducing the concentration of free acrylonitrile in an acrylonitrile polymer emulsion containing free acrylonitrile, comprising adding to said acrylonitrile polymer emulsion an oxime or mixtures of oximes in amounts and under conditions sufficient to react with said free acrylonitrile.

One advantage in the use of oximes to reduce the residual acrylonitrile concentration in polymer latex emulsions is that the oximes may be added directly to the latex without prior dilution with water or any other media. The direct addition of oximes to the latex results in no dilution of latex solids. An oxime in the solid, crystalline or liquid state may be utilized by adding it directly to the latex emulsion without preparation of a separate aqueous solution. Oximes can be utilized to effectively reduce the concentration of free acrylonitrile in latex emulsions without reducing the content of solids in the emulsion.

Another aspect of using oximes for reducing the free acrylonitrile concentration in polymer latex emulsions, is that they are nearly neutral compounds being very weakly acidic, and their use does not substantially change the pH of the treated latex. In contrast, basic compounds such as alkali-metal hydroxides or amines would result in an increase in the pH of the treated latex. Strongly acidic compounds will lower the pH of an emulsion drastically and lead to its destabilization. Because of their essentially neutral character, oximes can be added directly to a polymer latex emulsion in the polymerization reactor without causing coagulum formation and necessitating additional reactor clean-out procedures.

The following representative examples of oximes that can be used to reduce the free acrylonitrile concentration in a polymer emulsion containing free acrylonitrile are intended to illustrate but not limit the scope of the present invention. Aldoximes with the general structural formula:

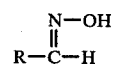
$$R-\overset{\overset{N-OH}{\|}}{C}-H$$

can be used where R is hydrogen or a hydrocarbon radical containing from 1 to 20 carbon atoms selected from the group consisting of alkyl, alkenyl, aralkyl, aryl, alkaryl, and cycloalkyl radicals. Some representative examples of aldoximes that can be used include: formaldoxime (formaldehyde oxide) acetaldoxime (acetaldehyde oxime), propionaldehyde oxime, isobutyraldehyde oxime, n-butyraldehyde oxime, valeraldehyde oxime, crotonaldehyde oxime, caproaldehyde oxime, n-heptaldehyde oxime, 2-furaldehyde oxime, and benzaldoxime (benzaldehyde oxime). Ketoximes with the general structural formula:

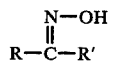
$$R-\overset{\overset{N-OH}{\|}}{C}-R'$$

can be used where R and R' are hydrocarbon radicals containing 1 to 20 carbon atoms selected from the group consisting of alkyl, alkenyl, aralkyl, aryl, alkaryl, and cycloalkyl radicals and where R and R' are the same or different. Some representative examples of ketoximes that can be used include: acetoxime (acetone oxime), methyl ethyl ketoxime (2-butanone oxime), diethyl ketoxime, methyl vinyl ketoxime, methyl n-propyl ketoxime, isobutyl methyl ketoxime, methyl cyclohexyl ketoxime, acetophenone oxime, propiophenone oxime, benzophenone oxime, phenyl p-tolyl ketoxime and isobutyrophenone oxime. In addition, cyclic ketoximes can be used. Some representative examples of cyclic ketoximes that can be used include: cyclopentanone oxime, cyclohexanone oxime, cycloheptanone oxime, cyclooctanone oxime, and cyclododecanone oxime. Dioximes can be used to reduce the concentration of residual or free acrylonitrile in a polymer emulsion containing free acrylonitrile. Some representative examples of dioximes are:

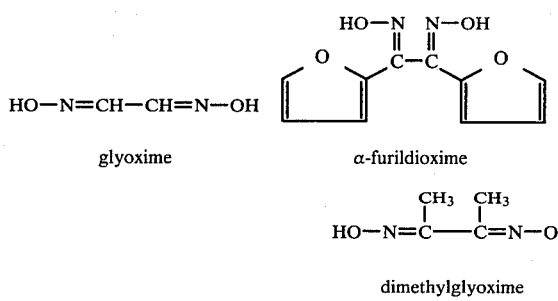

glyoxime    α-furildioxime

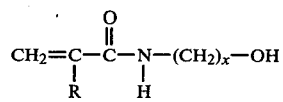

dimethylglyoxime

Some additional representative examples of dioximes include: 1,2-cyclohexanedione dioxime, 1,3-cyclohexanedione dioxime, and 1,4-cyclohexanedione dioxime.

The amount of oxime needed to remove all residual acrylonitrile must be at least equivalent stoichiometrically to the amount of residual acrylonitrile present. This stoichiometric relationship is based on the amount of residual acrylonitrile present in the system and the number of oxime groups needed to react with that amount of acrylonitrile. For example, if one mole of acrylonitrile was present in a system at least one mole of an oxime or one-half mole of a dioxime would be needed to eliminate all of the free acrylonitrile. Very substantial reductions have been obtained when 2 to 4 times the stoichiometric amount of oxime required to react with the free acrylonitrile present in an acrylonitrile polymer emulsion have been used. Even larger amounts of oximes may be used to react with residual acrylonitrile, but the use of larger amounts than necessary does not appear to be advantageous. If it is desirable to remove only part of the residual acrylonitrile, then, of course, less than the stoichiometric amount of oxime can be used.

This process for reacting free acrylonitrile with oximes can be used in an aqueous emulsion of any polymer containing free acrylonitrile. This process is particularly useful in acrylonitrile polymers which are polyacrylonitrile and copolymers formed by the polymerization of acrylonitrile with other vinyl comonomers. For example, this process is very useful for nitrile rubbers which are prepared by the copolymerization of butadiene and acrylonitrile. The monomer ratio between acrylonitrile and butadiene in nitrile rubbers may be varied over a wide range, however, normally no more than 50 percent of the nitrile rubbers chain linkages are derived from acrylonitrile. Other comonomers that may be polymerized with acrylonitrile to form polymers in which this process of removing residual acrylonitrile is useful include styrene, isoprene, alkyl acrylates, such as methyl acrylate, ethyl acrylate, butyl acrylate, methyl methacrylate and the like; vinylidene monomers having one or more terminal $CH_2=C<$ groups; vinyl aromatics such as α-methylstyrene, bromostyrene, chlorostyrene, fluorostyrene, vinylphenol, 3-hydroxy-4-methoxystyrene, vinylanisole, β-nitrostyrene, and the like; α-olefins such as ethylene; vinyl halides, such as vinylbromide, chloroethene (vinylchloride), vinylfluoride, vinyliodide, 1,2-dibromoethane, 1,1-dichloroethylene (vinylidene chloride), 1,2-dichloroethylene, and the like; vinyl esters such as vinyl acetate; α,β-olefinically unsaturated nitriles, such as methacrylonitrile; α,β-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; α,β-olefinically unsaturated N-alkylol amides having the general structural formula:

$$CH_2=C-\underset{R}{\overset{O}{\overset{\|}{C}}}-\underset{H}{N}-(CH_2)_x-OH$$

wherein R is a hydrogen atom or an alkyl group containing from 1 to 4 carbon atoms and x is an integer from 1 to 4 inclusive such as N-methylol acrylamide, N-ethylol acrylamide, N-propylol acrylamide, N-methylol methacrylamide, N-ethylol methacrylamide, and the like; vinyl pyridine; n-octyl methacrylate, dodecyl methacrylate, methyl ethacrylate, and ethyl ethacrylate; haloalkyl acrylates such as chloropropyl acrylate; methacrylates; hydroxyethylacrylate; polyfunctional compounds such as ethylene glycol dimethacrylate, diethylene glycol diacrylate, divinyl benzene, alkenyl pentaerythritol, methylene-bis-acrylamide, and the like; α,β-olefinically unsaturated carboxylic acids containing from 3 to 10 carbon atoms such as methacrylic acid, acrylic acid, crotonic acid, β-acryloxy propionic acid, sorbic acid, hydrosorbic acid, α-chlorosorbic acid, cinnamic acid, β-styrlacrylic acid, itaconic acid, citraconic acid, maleic acid, fumaric acid, mesaconic acid, aconitic acid, and glutaconic acid.

In the polymerization of acrylonitrile monomer with one or more of the above-mentioned monomers there can be competing or side reactions which take place. Therefore, the choice of reactants, process conditions, order of addition of the reactants and the like should be selected in order to produce a useful polymer containing acrylonitrile linkages. In general, the resulting copolymer, terpolymer or multimonomer polymer should contain at least about 5 percent by weight of acrylonitrile. If the polymer is a copolymer with acrylonitrile, the acrylonitrile portion may be as high as about 95 percent by weight of the resulting copolymer. The polymers which are preferred are polyacrylonitrile, butadiene-acrylonitrile copolymers, styrene-butadieneacrylonitrile terpolymers, acrylonitrile-butadienemethacrylic acid terpolymers, and terpolymers of acrylonitrile, butadiene, and acrylic acid.

The polymers for which this process is useful may be synthesized using any conventional polymerization technique. Emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization. Normally, such an emulsion polymerization can be run over a very wide temperature range with good results being obtained when the reaction is run from about 5° to 80° C. for many common polymers. The polymerization of these acrylonitrile containing polymers may be initiated using free radical catalysts, ultraviolet light, or radiation. To insure a satisfactory polymerization rate, uniformly, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like.

The water soluble peroxygen free radical initiators are especially useful in aqueous emulsion polymerization. It may be desirable to add post-polymerization emulsifiers and stabilizers, which will not interfere with this process for removing residual acrylonitrile.

Oximes can be added to the free acrylonitrile containing aqueous emulsion at any time after the polymerization of the acrylonitrile polymer has been completed. Normally, the oxime will be added immediately after the polymerization is completed and prior to the separation of the emulsion to maximize the reaction time between the free acrylonitrile and the oxime. However, the oxime may be added directly to the polymerization reactor, flash tank, storage tank or finished latex. This reaction will take place over a wide temperature range with very good results being obtained from about 0° to 95° C.

In practice, it is contemplated that the molar equivalent of oxime groups used will be 2 to 4 times the number of moles of free acrylonitrile present in the emulsion. If the time period in which the oxime has to react with the acrylonitrile is short, it will be desirable to use even greater amounts of the oxime. Oximes containing 20 or less carbon atoms, are preferred for reducing the concentration of free acrylonitrile in polymer latex emulsions. Preferred oximes are soluble in the aqueous latex emulsion at some temperature within the preferred operating range of 0° C. to 95° C. It is permissible and sometimes preferable to steam and/or vacuum strip the polymer emulsion to remove as much free acrylonitrile as possible and then to use an oxime to react with the remainder of the free acrylonitrile which is difficult or impossible to remove completely by stripping techniques. By utilizing this combination of methods for reducing the free acrylonitrile content of an emulsion, less oxime need be used. The oxime can be added to the aqueous emulsion in any manner. Excellent results have been obtained by direct addition of solid, crystalline or liquid oximes or by dilution of the oxime in a suitable media such as water.

This process is of tremendous value in the treatment of effluent streams wherein undesirable amounts of acrylonitrile are dissolved. By treating aqueous effluents from manufacturing plants that utilize acrylonitrile monomer with oximes the amount of free acrylonitrile would be minimized. A further application of this process would be the use of oximes as gas scrubbers where gaseous effluents from reactors and the like contain undesirable acrylonitrile that is vented to the atmosphere.

This invention is illustrated by the following examples which are merely for the purpose of illustration and are not to be regarded as limiting the scope of the invention or manner in which it may be practiced. Unless specifically indicated otherwise, parts and percentages are given by weight.

EXAMPLES 1 THROUGH 3

In order to demonstrate the effectiveness of oximes in reacting with free acrylonitrile in latex systems, acetone oxime was added to a typical copolymer latex of acrylonitrile and 1,3-butadiene which contained residual acrylonitrile monomer. The charge composition used in the synthesis of this nitrile rubber latex was 140 parts water, 11 parts rosin acid (soap), 0.1 parts sodium sulfate, 45.0 parts acrylonitrile, 55.0 parts 1,3-butadiene, 0.2 parts potassium persulfate ($K_2S_2O_8$) and 0.1 parts t-dodecyl mercaptan. Of the rosin acids about 90 percent are isometric with abietic acid and the other 10 percent is a mixture of dihydroabietic acid and dehydroabietic acid.

To a series of 4-ounce bottles, 100 gram aliquots of the acrylonitrile-1,3-butadiene polymer latex (about 40% solids) were added. Specified amounts of solid oxime (undiluted) were added, the bottles were then capped and tumbled in a water bath at 60° C. for 2 hours. The latex samples were then allowed to stand at 25° C. until after 24 hours when they were tested for free acrylonitrile. The polymer latex samples were examined for residual acrylonitrile by head-space gas chromatographic analysis. In the procedure used, 0.5 gram samples of latex containing an internal standard were diluted to 5 ml. (milliliters) with deionized water. After heating the samples at 90° C. for 1 hour, a head space vapor aliquot was analyzed in a Perkin-Elmer Head Space Injector F42 Chromatograph. A ⅛ inch diameter by 4 foot (2×2) column packed with 100–120 mesh Chromsorb 104 was utilized.

The latex contained about 2530 ppm (parts per million) of free acrylonitrile before treatment. The concentration of free acrylonitrile after treatment with various molar ratios of acetone oxime to free acrylonitrile is given in Table I.

TABLE I

| Example | Molar Ratio (oxime/acrylonitrile) | Free Acrylonitrile Concentration, ppm | % Reduction in Free Acrylonitrile |
|---------|-----------------------------------|---------------------------------------|-----------------------------------|
| 1 | 2 | 535 | 79 |
| 2 | 4 | 380 | 85 |
| 3 | 6 | 285 | 89 |

When a molar ratio of acetone oxime to free acrylonitrile of 6 was employed, the acrylonitrile level was reduced to 285 ppm which is a reduction of about 89 percent. When a molar ratio of oxime to acrylonitrile of 4 was used, the concentration of free acrylonitrile was reduced to 380 ppm which is a reduction of 85 percent. As is illustrated in these examples, acetone oxime was very effective in reacting with free acrylonitrile by this process resulting in a very dramatic reduction in the amount of free acrylonitrile present in this latex emulsion. These Examples demonstrate the effectiveness of ketoximes in reacting with residual acrylonitrile.

EXAMPLE 4

Solid acetone oxime (undiluted with water) was added to a latex sample as specified in Examples 1–3. Except in this experiment the treatment temperature was kept at 25° C. until the sample was tested for free acrylonitrile after 24 hours. Using the same analytical procedure as was specified in Examples 1–3, the concentration of free acrylonitrile was reduced from 4180 ppm to 810 ppm by employing a molar ratio of acetone oxime to acrylonitrile to 6. This is a reduction of about 81% in the concentration of free acrylonitrile present in this latex emulsion. This illustrates the effectiveness of acetone oxime in reacting with acrylonitrile and reducing its concentration at a constant temperature of 25° C.

EXAMPLE 5

Acetone oxime was added to a latex emulsion sample as specified in Example 4, except in this experiment a 20 weight percent aqueous solution of acetone oxime was used. Using a molar ratio of 2.4 (oxime to acrylonitrile) a reduction in the concentration of free acrylonitrile from 2475 ppm to 952 ppm was obtained which is a reduction of about 62%.

EXAMPLE 6

A 50 weight percent aqueous solution of acetaldehyde oxime was added to the same latex using the same procedure as specified in Examples 1-3 in place of acetone oxime. The latex contained about 2530 ppm of free acrylonitrile before treatment. The concentration of free acrylonitrile after treatment with a molar ratio of 2 of acetaldehyde oxime to free acrylonitrile was 353 ppm which is a reduction of 86%. As can be determined from this example acetaldehyde oxime is very effective in reacting with free acrylonitrile in this process. There was a very dramatic reduction in the concentration of free acrylonitrile in this nitrile rubber latex emulsion.

EXAMPLES 7 AND 8

Using the same nitrile rubber latex and procedure as specified in Example 4 specified molar amounts of acetaldehyde oxime (50 weight percent aqueous solution) were added to the latex emulsion in place of the acetone oxime. The latex contained about 2475 ppm of free acrylonitrile before treatment. The concentration of free acrylonitrile after treatment with molar ratios of 2 and 3 of acetaldehyde oxime to acrylonitrile is given in Table II.

TABLE II

| Example | Molar Ratio (oxime/acrylonitrile) | Free Acrylonitrile Concentration, ppm | % Reduction in Free Acrylonitrile |
|---|---|---|---|
| 7 | 2 | 314 | 87 |
| 8 | 3 | 236 | 90 |

When a molar ratio of acetaldehyde oxime to free acrylonitrile of 3 was employed and the treatment temperature was kept at 25° C. until the sample was tested for free acrylonitrile the free acrylonitrile concentration was reduced to 236 ppm which is a reduction of 90 percent. This demonstrates the effectiveness of aldoximes in reacting with residual acrylonitrile. No coagulum was formed during this treatment with concentrated (50 weight %) acetaldehyde oxime solution.

EXAMPLE 9

Using the same latex emulsion and procedure as was specified in Examples 7 and 8, a molar ratio of 6 of acetaldehyde oxime solution (50 weight %) was employed to react with the free acrylonitrile. Except in this example the latex emulsion had a free acrylonitrile concentration before treatment of 4180 ppm. The concentration of free acrylonitrile was reduced to 360 ppm which is a reduction of 91 percent.

EXAMPLES 10 and 11

Using the same nitrile rubber emulsion and procedure as specified in Examples 1 through 3, molar ratios of 2 and 4 of solid cyclohexanone oxime (undiluted with water) to acrylonitrile were employed in place of the acetone oxime. This latex emulsion contained about 2530 ppm of acrylonitrile before treatment. The concentration of free acrylonitrile after treatment is shown in Table III.

TABLE III

| Example | Molar Ratio (oxime/acrylonitrile) | Free Acrylonitrile Concentration, ppm | % Reduction in Free Acrylonitrile |
|---|---|---|---|
| 10 | 2 | 425 | 83 |
| 11 | 4 | 289 | 89 |

At a molar ratio of cyclohexanone oxime to acrylonitrile of 4 the concentration of free acrylonitrile was reduced from 2530 ppm to 289 ppm which is a reduction of about 89 percent. These Examples demonstrate the effectiveness of cyclic oximes in reacting with free acrylonitrile in an acrylonitrile polymer emulsion. Since the cyclohexanone oxime was utilized as a powdery solid, no dilution of the latex solids occurred.

EXAMPLE 12

Using the same nitrile rubber emulsion and procedure as specified in Example 4, a molar ratio of 2 of glyoxime to acrylonitrile was employed in place of the acetone oxime. The concentration of free acrylonitrile was reduced from 1915 ppm to 765 ppm which is a reduction of 60%. This demonstrates the effectiveness of dioximes in reacting with free acrylonitrile. Since solid glyoxime was utilized no dilution of the latex solids resulted.

While certain representative embodiments and details have been shown for the purpose of illustrating the invention, it will be apparent to those skilled in this art that various changes and modifications may be made therein without departing from the scope of the invention.

What is claimed:

1. An improved process for reducing the concentration of free acrylonitrile in an acrylonitrile polymer emulsion containing free acrylonitrile, comprising adding to said acrylonitrile polymer emulsion an oxime in amounts and under conditions sufficient to react with said free acrylonitrile to form a cyanoethyl oximino ether linkage.

2. An improved process as specified in claim 1 wherein at least a stoichiometric amount of said oxime is added to react with said free acrylonitrile.

3. An improved process as specified in claim 2 wherein the amount of said oxime added is 2 to 4 times the stoichiometric amount of said oxime required to react with said free acrylonitrile present in said acrylonitrile polymer emulsion.

4. An improved process as specified in claim 1 wherein said oxime is added to said acrylonitrile polymer emulsion at any time after the polymerization of said acrylonitrile polymer has been completed.

5. An improved process as specified in claim 4 wherein said oxime is added to said acrylonitrile polymer emulsion immediately after the polymerization of said acrylonitrile polymer has been completed.

6. An improved process as specified in claim 1 wherein said oxime is added to said acrylonitrile polymer emulsion which is at a temperature of 0° to 95° C.

7. An improved process as specified in claim 1 wherein said oxime contains 20 or less carbon atoms.

8. An improved process as specified in claim 7 wherein said oxime is selected from the group consisting of acetone oxime, methyl ethyl ketoxime, cyclohexanone oxime, acetaldehyde oxime, diethyl ketoxime, propionaldehyde oxime, formaldehyde oxime, benzaldehyde oxime, acetophenone oxime, benzophenone oxime, glyoxime, and dimethylglyoxime.

9. An improved process as specified in claim 8 wherein said oxime is acetaldehyde oxime.

10. An improved process as specified in claim 8 wherein said oxime is glyoxime.

11. An improved process as specified in claim 8 wherein said oxime is selected from the group consisting of acetone oxime, methyl ethyl ketoxime, and cyclohexanone oxime.

12. An improved process as specified in claim 1 wherein said acrylonitrile polymer is a copolymer of butadiene and acrylonitrile.

13. An improved process as specified in claim 12 wherein said copolymer of butadiene and acrylonitrile has up to 50 percent of its chain linkages being derived from acrylonitrile.

14. An improved process as specified in claim 1 wherein said acrylonitrile polymer is selected from the group consisting of polyacrylonitrile; copolymers of ethyl acrylate and acrylonitrile; copolymers of styrene and acrylonitrile; copolymers of isoprene and acrylonitrile; terpolymers of butadiene, styrene, and acrylonitrile; terpolymers of butadiene, methacrylic acid, and acrylonitrile; terpolymers of butadiene, acrylonitrile, and acrylic acid; terpolymers of butadiene, acrylonitrile, and hydroxyethylacrylate; and copolymers of butadiene, acrylonitrile, styrene, and itaconic acid.

* * * * *

UNITED STATES PATENT OFFICE
CERTIFICATE OF CORRECTION

PATENT NO. : 4,365,027
DATED : Dec. 21, 1982
INVENTOR(S) : Michael L. Senyek and Albert J. Costanza It is certified that error appears in the above-identified patent and that said Letters Patent are hereby corrected as shown below:

Column 1, Line 45-Formula: $CH_3-\overset{\overset{N-OH}{\|}}{C}-CH_3 + CH_2-CH-C\equiv N \longrightarrow$ should be: $CH_3-\overset{\overset{N-OH}{\|}}{C}-CH_3 + CH_2=CH-C\equiv N \longrightarrow$ Signed and Sealed this Thirty-first Day of May 1983

[SEAL]

Attest:

DONALD J. QUIGG

Attesting Officer

Acting Commissioner of Patents and Trademarks